United States Patent [19]

Davidse et al.

[11] 3,717,727

[45] Feb. 20, 1973

[54] COLOR SHIFTING CIRCUIT FOR A COLOR TELEVISION DISPLAY APPARATUS

[75] Inventors: Jan Davidse, Cypruslaan; Hendrik Johannes Saderson, Emmasingel, both of Netherlands

[73] Assignee: U.S. Philips Corporation, New York, N.Y.

[22] Filed: Nov. 5, 1970

[21] Appl. No.: 87,158

[30] Foreign Application Priority Data

Nov. 7, 1969 Netherlands ........................6916801

[52] U.S. Cl. ..........................178/5.4 HE, 178/5.4 SD

[51] Int. Cl. ..............................................H04n 9/50

[58] Field of Search ............178/5.2 R, 5.4 R, 5.4 H, 178/DIG. 37, DIG. 34, DIG. 36; 356/178, 177

[56] References Cited

UNITED STATES PATENTS 3,551,589 12/1970 Moskovitz ........................178/5.4 R

*Primary Examiner*—Robert L. Griffin
*Assistant Examiner*—John C. Martin
*Attorney*—Frank R. Trifari

[57] ABSTRACT

A color shifting circuit for a color television circuit in which a carrier is quadrature modulated with the aid of color difference signals whereafter the phase modulation thus obtained is deepened with the aid of a phase multiplier circuit while means are present for substantially maintaining the amplitude modulation obtained and in which the obtained signal of the deepened phase modulation is demodulated along a number of demodulation axes so as to obtain new color difference signals and in which optionally a correction of the saturation of the transformed colors may be effected with the aid of a saturation correction circuit.

7 Claims, 6 Drawing Figures

INVENTORS
JAN DAVIDSE
HENDRIK J. SANDERSON
BY
AGENT

INVENTORS
JAN DAVIDSE
HENDRIK J. SANDERSON
BY
[signature]
AGENT

INVENTORS
JAN DAVIDSE
HENDRIK J. SANDERSON
BY
AGENT

COLOR SHIFTING CIRCUIT FOR A COLOR TELEVISION DISPLAY APPARATUS

The invention relates to a color shifting circuit for a color television display apparatus in which an original color information signal combination can be converted into an adapted color information signal combination.

It is known from Donald G. Fink, McGraw Hill 1955, Color Television Standards, pages 448–466 that color shifts may be obtained in a color television circuit with the aid of linear or non-linear combinations of color information signals.

An object of the present invention is to provide a novel circuit based on a different principle with which large color shifts may be obtained in a simple manner while optionally maintaining one of the original colors and with which it may be achieved in a simple manner that the reproduction of the luminance is not influenced by the color shifts produced.

According to the invention, a color shifting circuit of the kind described in the preamble is characterized in that an input combination of the color shifting circuit is coupled to a modulation signal input combination of a phase and amplitude modulation circuit, a carrier signal input of said phase and amplitude modulation circuit being coupled to an output of a carrier signal generating circuit, and an output of said phase and amplitude modulation circuit being coupled through at least a phase multiplier circuit to a phase and amplitude demodulation circuit.

By using a quadrature modulation to be obtained with the aid of the phase and amplitude modulation circuit, the phase modulation represents, for example, the hue and the amplitude modulation of the color saturation. By using a phase multiplication after phase modulation this phase modulation is deepened and after a subsequent phase demodulation color information signals are obtained whose hue information may be shifted considerably. The magnitude and direction of this shift is dependent on the phase of the original phase-modulated signal relative to a reference phase. A color shift obtained in this manner therefore has the character of a color exaggeration or a color expansion. The extent of exaggeration is determined by the multiplication factor of the phase multiplier circuit.

A color expansion circuit according to the invention is therefore very much suitable for use in color television circuits for medical purposes such as, for example, in skin and vascular disease diagnostics and in anesthetics and for other uses where it must be possible to observe a slight color shift easily such as, for example, in chemical and analytical processes.

In order that the invention may be readily carried into effect, an embodiment thereof will now be described in detail by way of example with reference to the accompanying diagrammatic drawings, in which FIG. 1 illustrates by way of a non-detailed block diagram a television circuit including a color shifting circuit according to the invention.

Figure 1:
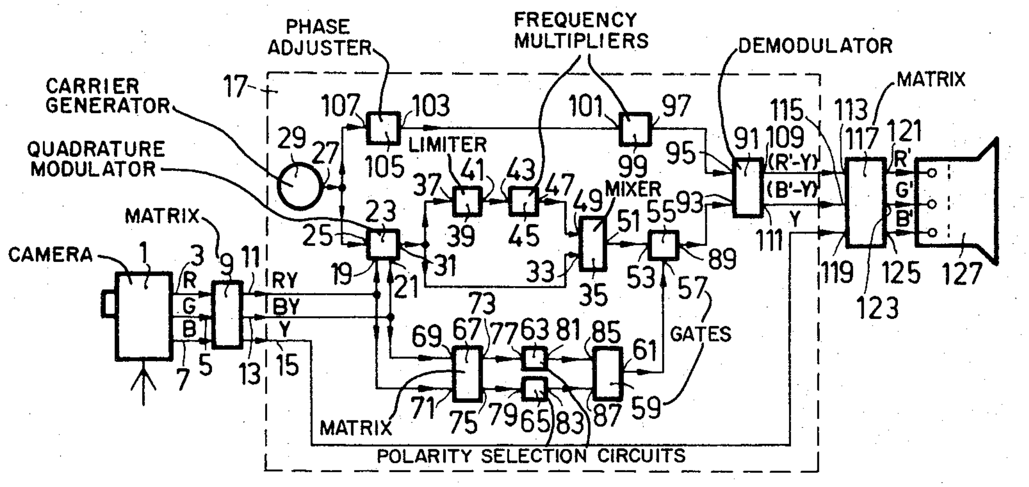

In FIG. 1, a color television camera 1 has three connections 3, 5 and 7 with a first matrix circuit 9. The color television camera 1 provides a red, a green and a blue chrominance signal (R, G and B, respectively) which is converted in the first matrix circuit 9 into a luminance signal $Y = \alpha R + \beta G + \gamma B$, a first color information signal $K_1 = a_1R + b_1G + c_1B$ and a second color information signal $K_2 = a_2R + b_2G + c_2B$ in which preferably $\alpha + \beta + \gamma = 1$, $a_1 + b_1 + c_1 = 0$ and $a_2 + b_2 + c_2 = 0$, so as to satisfy the principle of constant luminance.

Any suitable combination of R, G and B may be used in principle for these color information signals $K_1$ and $K_2$. One of the most commonly used combinations which is taken by way of example in this connection is a red color difference signal (R−Y) for $K_1$ and a blue color difference signal (B−Y) for $K_2$. These signals (R−Y), (B−Y) and Y are applied to inputs 11, 13 and 15, respectively, of a color expansion circuit 17 according to the invention.

The inputs 11 and 13 are connected to two inputs 19 and 21 of a phase and amplitude modulation circuit 23 formed as a quadrature modulation circuit. The phase and amplitude modulation circuit 23 has a carrier signal input 25 which is connected to an output 27 of a carrier signal generator 29.

Figure 3:
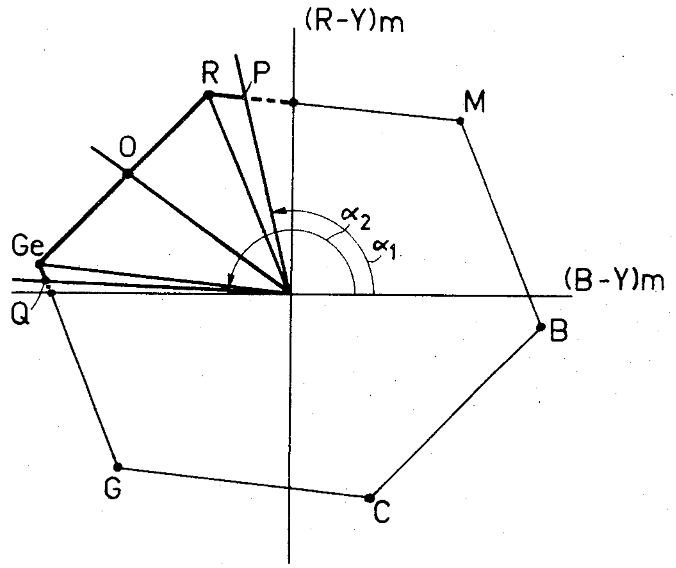
FIG. 3 shows a system of modulation axes for a signal quadrature-modulated by color difference signals and a sector to be expanded corresponding to the sector of the color gamut of FIG. 2.

The carrier signal generator 29 applies a carrier signal of a certain frequency, for example, 4.43 MHz to the carrier signal input 25 of the quadrature modulation circuit 23. The quadrature modulation circuit 23 applies a carrier signal to an output 31 which signal is quadrature-modulated by the color difference signals (R−Y) and (B−Y) applied to the inputs 19 and 21. The system of modulation axes of this carrier signal thus phase and amplitude-modulated is shown in FIG. 3 including an indication of the phase and amplitude associated with a number of saturated colors such as red (R), yellow (Ge), green (G), blue (B) and magenta (M). In this respect it is once more to be noted that the chosen modulation axes $(R-Y)_m$ and $(B-Y)_m$ and the values of the scale along said axes only serve as an Example and do not involve any limitation as regards the possibilities of use of the circuit according to the invention.

The output 31 of the quadrature modulation circuit 23 is connected to a first input 33 of a mixer circuit 35 and to an input 37 of a limiter circuit 39. An output 41 of the limiter circuit 39 is connected to an input 43 of a frequency tripler 45 an output 47 of which is connected to a second input 49 of the mixer circuit 35.

In the limiter circuit 39 the phase and amplitude-modulated carrier signal originating from the output 31 of the quadrature modulation circuit 23 and applied to the input 37 of the limiter circuit is deprived of its amplitude modulation and is subsequently applied to the input 43 of the frequency tripler 45.

A signal without amplitude modulation is obtained at the output 47 of the frequency tripler 45, which signal has a frequency of three times the original carrier frequency and a phase modulation depth which is three times larger than that of the signal applied to the input 43 thereof. The output signal from the frequency tripler 45 is applied to the second input 49 of the mixer circuit 35. The first input 33 of the mixer circuit 35 receives the phase and amplitude-modulated signal of the carrier frequency originating from the output 31 of the quadrature modulation circuit 23.

By mixing the signals applied to the inputs 33 and 49, the mixer circuit 35 constitutes a signal of the sum frequency which comprises the amplitude modulation obtained in the quadrature modulation circuit 23 and a phase modulation having a modulation depth which is four times larger than that of the signal at the output 31 of the quadrature modulation circuit 23. This signal of the sum frequency appears at an output 51 of the mixer circuit 35.

The output 51 of the mixer circuit 35 is connected to an input 53 of a first gating circuit 55. The first gating circuit 55 only serves to pass signals having a phase modulation depth which is not too large. Due to the fourfold deepening of the phase modulation of the signal in the frequency multiplier circuit incorporated between the output 31 of the quadrature modulation circuit 23 and the input 53 of the first gating circuit 55 a phase modulation which is larger than + or −45° relative to a reference axis in the signal at the output 31 of the quadrature modulation circuit 23 would be converted into a phase modulation which is larger than + or −180° relative to a reference axis in the signal at the input 53 of the first gating circuit 55. In certain cases this might cause an unwanted color reproduction at a later stage of signal handling. To avoid this, the gating circuit 55 only passes a signal when this signal as regards its phase is within a certain range smaller than + or −180° relative to a reference phase.

To this end a gate signal input 57 of the gating circuit 55 receives a sector selection signal originating from a sector selection circuit. This sector selection circuit includes a second gating circuit 59 an output 61 of which is connected to the gate signal input 57 of the first gating circuit 55, two polarity selection circuits 63 and 65 and a sector limiter matrix 67.

Two inputs 69 and 71 of the sector limiter matrix 67 are connected to the inputs 11 and 13 of the color expansion circuit 17 and receive a red (R−Y) and a blue (B−Y) color difference signal.

In the sector limiter matrix 67 the signals (R−Y) and (B−Y) are combined in two ratios which are determined by sector critical angles $\alpha_1$ and $\alpha_2$ which are shown in FIG. 3 in the system of modulation axes and this in such a manner that a first signal combination includes the signals (B−Y) and (R−Y) in an amplitude ratio of $K_2/K_1 = (B - Y)/(R - Y)$ equal to $tg\alpha_1$ and a second signal combination in an amplitude ratio of $K_2/K_1 = (B - Y)/(R - Y)$ equal to $tg\alpha_2$. These two signal combinations become available at outputs 73 and 75 respectively, of the sector limiter matrix 67 and are each applied to inputs 77 and 79 of the polarity selection circuits 63 and 65, respectively.

The polarity selection circuits 63 and 65 are each formed by a threshold circuit, (amplitude-compacitor) such as, for example, a difference amplifier having a large amplification factor and a limiter action which applies a signal to outputs 81 and 83 when the signal at the inputs 77 and 79, respectively, has a certain polarity and does not apply a signal when the input signal has the opposite polarity. The polarity of the input signal at which an output signal is provided is determined by the fact which if the input terminals of the difference amplifier is connected to earth or to a reference potential and which terminal is connected to the inputs 77 and 79 of the polarity selection circuits 63 and 65, respectively.

The output signals at the outputs 81 and 83 of the polarity selection circuits 63 and 65 are applied to inputs 85 and 87, respectively, of the second gating circuit 59.

The output of the second gating circuit 59 only provides a gate signal when a signal is present at its two inputs 85 and 87. As a result the first gating circuit 55 only passes a signal when the signal at the output 31 of the quadrature modulation circuit, as seen in the system of modulation axes of FIG. 3, falls within the sector bounded by the non-coincident sides of the angles $\alpha_1$ and $\alpha_2$ and the signal applied to the input 53 appears at an output 89 thereof.

Figure 2:
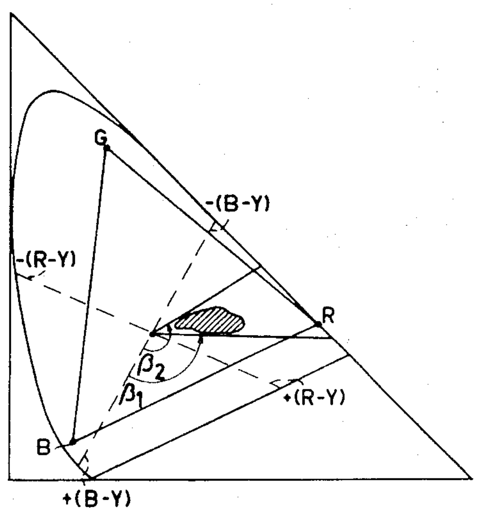
FIG. 2 shows an example of a sector in the color gamut which can be expanded with the aid of the circuit of FIG. 1.

The sides of the angles $\alpha_1$ and $\alpha_2$ in FIG. 3 bound a sector in this embodiment which substantially corresponds to a sector which is bounded by two non-coincident sides of two angles $\beta_1$ and $\beta_2$ in the color gamut of FIG. 2.

In FIG. 2 a shaded area comprising the colors of the human skin lies within this sector, which area may be expanded in color in a color television system with the aid of the circuit according to the invention so as to render an observation of small differences in this skin color better visible for the purpose of, for example, diagnostics or anesthetics. The result of this expansion is visible in the system of demodulation axes of FIG. 4 in which a number of color points P′, R′, O′, Ge′ and Q′ of a signal at the output 89 of the first gating circuits is shown, which points correspond to the color points P, R, O, Ge and Q, respectively, in the system of modulation axes of FIG. 3 showing the signal at the output 31 of the quadrature modulation circuit 23.

Figure 4:
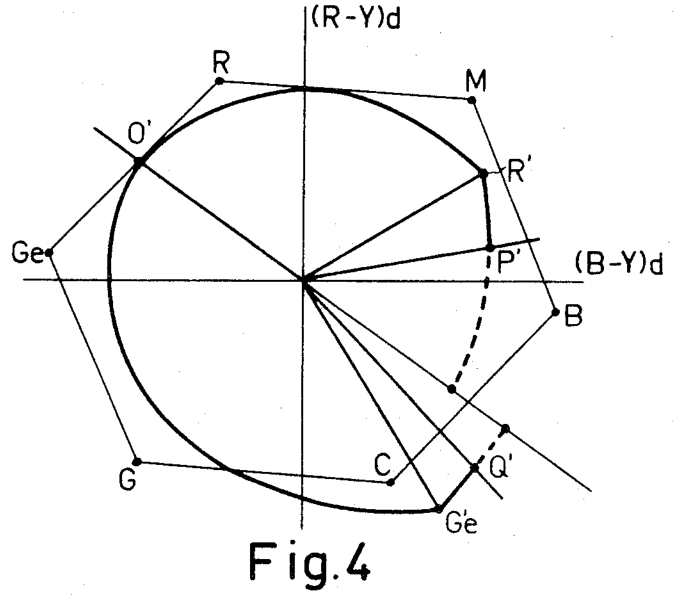
FIG. 4 shows a system of demodulation axes in a sector of the system of modulation axes of FIG. 3 expanded with the aid of a circuit of FIG. 1 according to the invention.

The signal at the output 89 of the first gating circuit 55 is demodulated in accordance with the system of axes of FIG. 4 in a demodulator circuit 91 an input 93 of which is connected to the output 89 of the first gating circuit 55.

Furthermore, a reference signal input 95 of the demodulator circuit 91 is connected to an output 97 of a frequency quadrupler 99. An input 101 of the frequency quadrupler 99 is coupled to an output 103 of a phase adjusting circuit 105 an input 107 of which is connected to the output 27 of the carrier signal generator 29.

A reference signal is obtained at the reference signal input 95 of the demodulator circuit 91 from this output 27 of the carrier signal generator 29 through the phase adjusting circuit 105 and the frequency quadrupler 99, which reference signal has the same frequency as the phase and amplitude-demodulated signal to be demodulated and applied to the input 93 and having a phase which is adjustable relative thereto. In the demodulator circuit 95, the signal applied to the input 93 is demodulated with the aid of this reference signal in accordance with the demodulation axes $(R-Y)_d$ and $(B-Y)_d$ shown in FIG. 4 and is converted into new color difference signals (R'−Y) and (B' − B) which become available at outputs 109 and 111, respectively, and are applied to two inputs 113 and 115, respectively, of a display matrix 117. Furthermore, the display matrix 117 has an input 119 which is connected to the input 15 of the color expansion circuit 17 and to which the luminance signal Y is applied, and three outputs 121, 123 and 125 which are each connected to a different one of three cathodes of a color television display tube 127. The transformed signal combination originating from the outputs 121, 123 and 125 of the display matrix 117 is displayed on the color television display tube 127.

As may be noted from the system of demodulation axes of FIG. 4 as compared with the system of modulation axes of FIG. 3 hues are maintained after color expansion on the axis through O during display. In FIG. 4 these hues lie on an axes going through O'. Hues which were originally red (R) are shifted towards magenta and originally yellow hues (Ge) are shifted towards cyan (C). Due to this shift originally small differences in hue are thus greatly exaggerated upon display and have thus become better noticeable.

The system of demodulation axes of FIG. 4 may be rotated relative to the configuration P', R', O', Ge', Q' with the aid of the phase adjusting circuit 105. As a result an arbitrary different hue may be chosen which does not vary relative to the original hue by the transformation.

When the display matrix 117 is adapted in the correct manner so that $$G' = -(\alpha/\beta)(R'-Y) - (\alpha/\beta)(B'-Y) + Y$$

the principle of constant luminance is maintained. An optical gamma correction is preferably provided between the display matrix 117 and the display tube 127.

It will be evident that the phase adjusting circuit 105 may optionally be incorporated, for example, in the connection from the output 27 of the carrier generator 29 to the input 25 of the phase and amplitude modulation circuit 23.

The first gating circuit 55, which in the embodiment described prevents the supply of a modulated signal to the input 93 of the demodulator circuit 91 when the color information falls beyond the sector to be transformed as shown in FIG. 3, may optionally be incorporated at a different position in the circuit or it may have a multifold construction if it is avoided that corresponding unwanted demodulated transformed signals (R'−Y) and (B'−Y) reach the inputs 113 and 115 of the matrix circuit 117.

The gating circuit 55 may of course be omitted when, for example, due to the choice of illumination of the object to be observed or the color range covered by this object there is no risk of signals occurring beyond the sector to be expanded shown in FIG. 3.

The sector to be expanded shown in FIG. 3 is chosen in the embodiment described in such a manner that $(\alpha_2 - \alpha_1) < 90°$. When choosing a multiplication factor n which is not equal to the factor 4 used in this case $(\alpha_2 - \alpha_1)$ must generally be chosen to be 360°. With a multiplication factor of 2 it is sufficient to have one polarity selection circuit 63 or 65. The second gating circuit 59 may then be omitted.

In the embodiment described the sector selection matrix 67 may be omitted. The inputs 77 and 79 of the polarity selection circuits 63 and 65 must then be connected to the inputs 11 and 13 of the color expansion circuit 17. The angles $\alpha_1$ and $\alpha_2$ in FIG. 3 then become 90° and 180°.

Optionally, a sector to be transformed and varying proportionally with the adjustment of the phase adjusting circuit 105 may be obtained when the input signals for the polarity selection circuits 63 and 65 are derived from synchronous demodulators which are controlled by signals originating from the outputs 103 and 31 of the phase adjusting circuit 105 and of the phase and amplitude demodulation circuit 23, respectively.

In the embodiment described above the frequency multiplication branch is formed with two signal paths terminating in the mixer circuit 35. A first path in which the modulated signal is limited in amplitude and is multiplied in frequency by a factor of $(n-1)$ and a second path along which the phase and amplitude-modulated signal is applied to the mixer circuit 35 without frequency transformation. The frequency multiplication and the attendant phase modulation deepening may of course alternatively be effected in a different manner while the amplitude modulation of the signal at the output 31 of the quadrature modulation circuit 23 may be introduced in a different manner into the signal to be demodulated, for example, by means of demodulation and remodulation. Furthermore, the frequency of the transformed signal may be reduced or increased while maintaining the amplitude modulation and the deepened phase modulation with the aid of a mixer circuit and an unmodulated signal originating, optionally after frequency multiplication from the carrier generator 29.

It is possible to perform additional corrections with regard to saturation or hue in certain areas of the color gamut sector to be transformed, for example, by using a so-called elliptic amplifier in one of the signal paths through which the modulated signal is applied.

Furthermore, it is possible to incorporate the color expansion circuit in a television circuit in which a display tube of the indexing type is used. A separate carrier generator 29 is then superfluous because a carrier signal is obtained from the mixing tube itself with the aid of a signal generator, which carrier signal may be quadrature-modulated at some point in the circuit and may furthermore be deepened in modulation as regards its phase modulation and brought to the frequency desired for display.

As a result of the phase multiplication at which the amplitude ratio of the phase and amplitude-modulated signal (chrominance signal) is not varied relative to the luminance signal Y during said multiplication, the saturation of the displayed colors generally does not correspond to the saturation of the original colors. For this purpose, a correction may be performed when the said amplitude ratio is made dependent on the instantaneous phase angle of the chrominance signal. As already described above this may be effected with the aid of an elliptic amplifier or a modulation circuit controlled by a phase demodulator.

Figure 5:
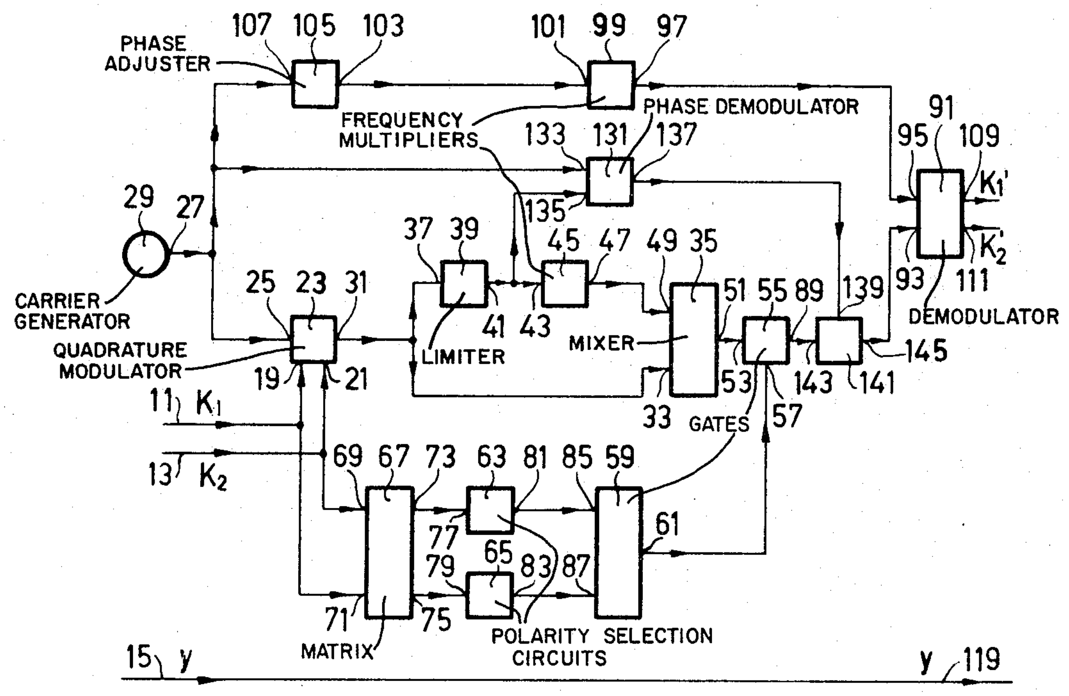
FIG. 5 illustrates an improvement of a circuit of FIG. 1 according to the invention to obtain a saturation correction of the shifted colors.

An improvement of the circuit of FIG. 1 in accordance with the latter principle is given in the circuit of FIG. 5 in which the reference numerals for corresponding parts are the same as those in the circuit of FIG. 2 to which reference is made from the description of these parts.

In FIG. 5 a phase demodulator 131 has a reference signal input 133 which is coupled to the output 27 of the oscillator 29 and a signal input 135 which is coupled to the output 41 of the limiter circuit 39. An output 137 of the phase demodulator 131 is connected to a modulation signal input 139 of an amplitude modulator 141. A signal input 143 of the amplitude modulator 139 is connected to the output 89 of the gating circuit 55, and an output 145 of said modulator is connected to the input 93 of the demodulator circuit 91.

The phase-multiplied signal applied to the input 93 of the demodulator circuit 91 is adapted in amplitude by the amplitude modulator 139 to a new amplitude ratio between the luminance signal Y and the transformed chrominance signal to be demodulated in the demodulator circuit 91, which amplitude ratio is desired after the phase multiplication. This amplitude ratio is corrected as a function of the non-transformed hue and thus of the phase angle of the signal applied to the signal input 135 of the phase demodulator 131. In the case considered, it will roughly be sufficient when the amplitude of the signal corresponding to the colors shifted in the direction of magenta and blue is increased and when that of the colors shifted in the direction of green and cyan is decreased by the amplitude modulator 139. It is of course possible to obtain a more accurate correction when a correction circuit is provided between the phase demodulator 131 and the modulation signal input 139 which correction circuit may provide for the desired amplitude characteristic.

The amplitude modulator 139 may of course alternatively be incorporated at a different point in the circuit arrangement such as, for example, between multiplier 99 and input 95 of the demodulator circuit 91.

The gating circuit 55 may optionally be combined with the amplitude modulator 139 in which firstly the signals originating from the output 61 of the second gating circuit 59 and from the output 137 of the phase demodulator 131 may be combined in a combination circuit.

Figure 6:
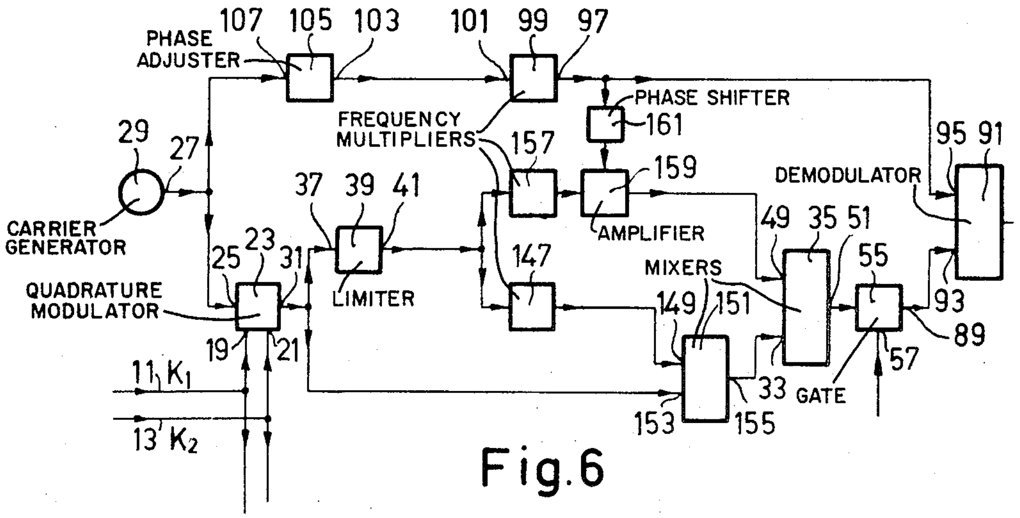
FIG. 6 shows part of a circuit of FIG. 1 in which a different multiplication factor is used and in which a saturation correction circuit including an elliptic amplifier is provided.

The circuit of FIG. 6 in which corresponding parts have the same reference numerals as those in FIG. 1 shows part of the circuit of FIG. 1 in which a number of other partial circuits are used. The circuit differs mainly from that in FIG. 1 in that a different phase multiplication factor and an elliptic amplifier for saturation corrections are used.

The frequency multiplier 99 now multiplies by a factor of 6 and a number of further stages are provided between the output 31 of the phase and amplitude modulator 23 and the inputs 33 and 47 of the mixer circuit 35.

The output 41 of the limiter circuit 39 is connected in a frequency multiplier 147 to an input 149 of a mixer circuit 151. A further input 153 of the mixer circuit 151 is connected to the output 31 of the phase and amplitude modulator 23. The frequency multiplier 147 multiplies by a factor of 2.

A signal of the original amplitude modulation and a frequency of 3 times the oscillator frequency and a phase sweep which is three times larger than that at the output 31 of the quadrature modulation circuit 23 appears at an output 155 of the mixer circuit 151.

Furthermore, the output 41 of the limiter circuit 39 is connected through a frequency tripler 157 and an elliptic amplifier 159 to the input 49 of the mixer circuit 35. Furthermore, the elliptic amplifier 159 receives a signal of 6 times the oscillator frequency through a phase shifter 161.

Thus a signal of 3 times the oscillator frequency is produced at the input 49 of the mixer circuit 35, which signal has a phase modulation which is three times larger than that at the output 31 of the quadrature modulation circuit 23 and the amplitude of which signal has become dependent on the phase angle due to the elliptic amplifier 159. This phase-angle dependent amplitude provides a saturation correction in the ultimate signal.

The signals from the inputs 49 and 33 are mixed in the mixer circuit 35 to form the sum frequency so that a signal is produced at the output 51 of the mixer circuit 35 which signal has a phase sweep which is 6 times larger than that at the output 31 of the modulation circuit 23, the same amplitude modulation and a phase-angle dependent amplitude correction.

The elliptic amplifier 159 may optionally be incorporated between limiter 39 and multipliers 157 and 147, or between multiplier 147 and input 149 of mixer 151, if the correct frequencies are applied to this amplifier.

What is claimed is:

1. A circuit for exaggerating the displayed color differences of original color information signals comprising a modulator means having inputs coupled to receive the color information signals and a carrier signal respectively for simultaneously amplitude and phase modulating said carrier with said color signals respectively, and an output for providing said phase and amplitude modulated carrier signals; a phase multiplier means having an input coupled to said modulated output, and an output for providing signals with greater phase differences with respect to each other than exist between said input phase and amplitude modulated signals; and a phase and amplitude demodulator means having inputs coupled to said phase multiplier means output and coupled to receive said carrier signal respectively, and an output for providing output color information signals having exaggerated color differences upon display as compared with said original color information signals.

2. A circuit as claimed in claim 1 further comprising a first polarity selection circuit means coupled to receive a signal dependent upon one of said original color information signals for generating a signal when said original signal has a selected polarity, and a first gate coupled between said phase multiplier and said demodulator and having a control input coupled to said polarity selection circuit.

3. A circuit as claimed in claim 2 further comprising a second gate having a first input coupled to said first polarity selection circuit, a second input, and an output coupled to said first gate control input; a second polarity selection circuit coupled to said second gate second input and coupled to receive a signal dependent upon said original color information signals.

4. A circuit as claimed in claim 1 wherein said phase multiplier means comprises an amplitude limiter coupled to said modulator; a frequency multiplier coupled to said limiter; and a mixer having a first input coupled to said frequency multiplier, a second input coupled to said modulator, and an output coupled to said demodulator.

5. A circuit as claimed in claim 1 further comprising a phase adjusting circuit coupled to receive said carrier signal and to said demodulator.

6. A circuit as claimed in claim 4 further comprising saturation correction means comprising a phase detector having a first input coupled to receive said carrier signal, a second input coupled to said limiter, and an output; and a gain controlled amplifier coupled between said phase multiplier and said demodulator having a gain control input coupled to said phase detector output.

7. A circuit as claimed in claim 4 further comprising a saturation correction means comprising a gain controlled amplifier coupled between said frequency multiplier and said mixer and having a gain control input; and a phase shifter coupled to receive a signal dependent upon said carrier signal and having an output coupled to said gain control input.

* * * * *